U S008284723B2

United States Patent
Huy

(10) Patent No.: US 8,284,723 B2
(45) Date of Patent: Oct. 9, 2012

(54) METHOD FOR MANAGING TRANSMISSION RESOURCES IN A CELLULAR COMMUNICATIONS NETWORK, CORRESPONDING TERMINAL, BASE STATION AND COMPUTER PROGRAM PRODUCT

(75) Inventor: Dinh Thuy Phan Huy, Paris (FR)

(73) Assignee: France Telecom, Paris (FR)

( * ) Notice: Subject to any disclaimer, the term of this patent is extended or adjusted under 35 U.S.C. 154(b) by 189 days.

(21) Appl. No.: 12/447,291

(22) PCT Filed: Oct. 23, 2007

(86) PCT No.: PCT/FR2007/052232
§ 371 (c)(1),
(2), (4) Date: Aug. 5, 2009

(87) PCT Pub. No.: WO2008/050060
PCT Pub. Date: May 2, 2008

(65) Prior Publication Data
US 2010/0111003 A1      May 6, 2010

(30) Foreign Application Priority Data
Oct. 25, 2006   (FR) ...................................... 06 09389

(51) Int. Cl.
*H04W 72/04* (2009.01)
(52) U.S. Cl. ......................... 370/329; 370/348; 370/310
(58) Field of Classification Search .................. 370/329, 370/310
See application file for complete search history.

(56) References Cited

U.S. PATENT DOCUMENTS 7,929,473 B2 * 4/2011 Willenegger et al. ......... 370/310
2009/0097444 A1 * 4/2009 Lohr et al. ..................... 370/329

FOREIGN PATENT DOCUMENTS

EP           1575326 A2    9/2005

OTHER PUBLICATIONS

"Part 16: Air Interface for Fixed Broadband Wireless Access Systems" IEEE Computer Society—Oct. 2004, parts 1 6, 8, and annex B.*
Eunchul Yoon et al. "Exploiting Channel Statistics to Improve the Average Sum Rate in OFDMA Systems", Vehicular Technology Conference 2005, VTC 2005, Spring 2005 IEEE 61ST Stockholm, Sweden, Apr. 30-May 1, 2005, Piscataway, NJ, USA, IEEE, May 30, 2005.

(Continued)

*Primary Examiner* — Dang Ton
*Assistant Examiner* — Pamit Kaur
(74) *Attorney, Agent, or Firm* — David D. Brush; Westman, Champlin & Kelly, P.A.

(57) ABSTRACT

A method and apparatus are provided for managing transmission resources in a cellular communication network having a plurality of cells each associated to a base station. The network includes at least two radio-communication terminals, a list of available transport formats or authorized list being associated with each of the terminals. The method includes optimizing frequency resources used by the terminals present in the network, and includes the following sub-steps: selecting a transport format specific for each terminal from a shortened list of transport formats, and allocating a frequency band to each terminal and having a size based on the selected transport format.

10 Claims, 4 Drawing Sheets

OTHER PUBLICATIONS

Sternad M. et al. "Channel Estimation and Prediction for Adaptive OFDMA/TDMA Uplinks, Based on Overlapping Pilots", Acoustics Speech, and Signal Processing, 2005 Proceedings, IEEE International Conference in Philadelphia, Pennsylvania, USA, Mar. 18-23, 2005, Piscataway, NJ, USA, IEEE, Mar. 18, 2005.

"System Analysis for UL SIMO SC-FDMA" (3GPP TSG-RAN G1#45/R1-061525, Shanghai, China, May 8-12, 2006, Qualcomm Europe).

English Translation of the International Preliminary Report on Patentability of Counterpart Application No. PCT/FR2007/052232 Filed on Oct. 23, 2007.

"Physical Layer Aspects for Evolved Universal Terrestrial Radio Access (UTRA)", 3GPP Technical Specification Group Radio Access Network (R7), 3GPP TR25814 v7.0.0—Jun. 2006.

"Feasibility Study for Enhanced Uplink for UTRA FDD; (R6)", 3GPP TR25896-600, Mar. 2004.

International Search Report of Counterpart Applciation No. PCT/FR2007/052232 Filed on Oct. 23, 2007.

French Search Report of Counterpart Application No. 06/09389 filed on Oct. 25, 2006.

* cited by examiner

METHOD FOR MANAGING TRANSMISSION RESOURCES IN A CELLULAR COMMUNICATIONS NETWORK, CORRESPONDING TERMINAL, BASE STATION AND COMPUTER PROGRAM PRODUCT

CROSS-REFERENCE TO RELATED APPLICATIONS

This Application is a Section 371 National Stage Application of International Application No. PCT/FR2007/052232, filed Oct. 23, 2007 and published as WO 2008/050060 on May 2, 2008, not in English.

STATEMENT REGARDING FEDERALLY SPONSORED RESEARCH OR DEVELOPMENT

None.

THE NAMES OF PARTIES TO A JOINT RESEARCH AGREEMENT

None.

FIELD OF THE DISCLOSURE

The field of the disclosure is that of digital communications, and especially radio communications.

More specifically, the disclosure pertains to the transmission of signals implementing OFDM (orthogonal frequency division multiplexing) type modulation, especially in the context of multiple access systems using OFDMA (orthogonal frequency division multiplexing access) type technology.

More specifically again, the disclosure pertains to the managing of transmission resources in a cellular communications network for uplink communications, i.e. from a radio communications terminal to a base station.

The term "terminal" is understood to mean especially a mobile apparatus of the radiotelephony, PDA (Personal Digital Assistant), laptop or other type.

BACKGROUND OF THE DISCLOSURE

For the sake of clarity, here below referring to FIG. 1, a definition is provided of the terminology used in the description, especially a definition of the term "resource units" in an OFDM frame.

More specifically, the horizontal axis 11 defines the time indices of the OFDM symbols (symbol time) and the vertical axis 12 defines the frequency indices of the OFDM symbols (sub-carriers). A time-frequency symbol therefore corresponds to a given symbol time $11_1$ for a given sub-carrier $12_1$ and a resource unit 13 corresponds to a set of time-frequency symbols.

Thus, FIG. 1 illustrates a representation of the resource units (also denoted as "URs") in an OFDM time-frequency frame, these resource units being located in frequency, i.e. using adjacent sub-carriers. Indeed, it may be recalled that the URs can be distributed or localized in frequency and may or may not use an entire time frame.

More specifically, we consider an OFDM type mobile network (for example a WIMAX or Worldwide Inter-Operability for Microwave Access type network) for which a time-frequency sub-division into disjoined resource units has been predefined. Such a network is presented especially in the document: "*Part16: Air Interface For Fixed Broadband Wireless Access Systems*", IEEE Computer Society, October 2004 and corresponds to a short-term communications system based on an OFDM physical layer as described in the document "*Physical layer aspects for evolved Universal Terrestrial Radio Access (UTRA)*", 3GPP Technical Specification Group Radio Access Network (R7), 3GPP TR25814 v7.0.0 (June 2006).

We also consider a cellular network comprising at least one base station and several mobile terminals associated with the base station or stations, each of these terminals having limited transmission power and several of these terminals seeking to transmit data at the same point in time.

Present-day techniques for allocating resources seek to optimize data transmission on uplink paths by adjusting the following parameters:
- the number of resource units;
- the type of modulation and encoding (also denoted as MCS for modulation and coding scheme);
- the position of the URs in the time-frequency frame;
- the transmission power allocated to the URs;

in order to maximize the cell capacity of the system.

Classically, these prior-art techniques rely on the sharing between the different terminals of the network (also called mobile units or apparatus) of the time and frequency resource. Thus, the mobile units regularly send information back to the base station associated with them on the quality of their propagation channel and their needs in terms of bit rate. A base station may also itself make measurements of radio quality on the uplink and use the set of previous information elements to choose the number, position and transmission power of the resource units in the time-frequency frame. The base station then deduces the transportation schemes associated with each mobile unit as a function of the type of modulation and encoding scheme (MCS) chosen, i.e. according to the principle of modulation and encoding adaptation (or "link adaptation").

Regularly, the base station sends its choice of transmission parameters to the mobile units present in the cell that it is managing. The mobile units can then transmit data elements in complying with the allocation set by the base station on which they are dependent.

More specifically, there is deemed to be a list of transport formats supported by mobile units, i.e. formats that can be transmitted by a mobile unit, a transport format being defined as the combination of a type of modulation and a type of encoding (MCS) with a fixed number of resource units to which there is a corresponding number of information bits (after decoding). A list of transport formats of this kind supported by a mobile unit is also called an authorized list.

If we consider a list of transport formats supported by a mobile unit and a choice of the size of the frequency band used by the mobile unit, it is thus possible to determine a sub-list of transport formats that the mobile unit can use.

Then, the mobile unit makes a selection from this sub-list of a transport format enabling the transmission of a maximum number of data elements with a given target quality ("link adaptation").

Referring to FIG. 2, a more precise description is provided of a technique for the selection of a transport format to allocate the time-frequency resources as proposed in the document "*System Analysis for UL SIMO SC-FDMA*" (3GPP TSG-RAN G1#45/R1-061525, Shanghai, China, 8-12 May, 2006, Qualcomm Europe).

To this end, we consider a base station managing a plurality of mobile units (M mobile units). B denotes the total bandwidth of the OFDM system and Ns denotes the number of associated sub-carriers.

In this technique, the frequency band $B_i$ usable by a mobile unit i is fixed and defined by:

$$B_i = \frac{P_{max}}{PSD/CL},$$

with:
Pmax is the maximum transmission power available for the mobile considered;
PSD is the target spectral density of power of the mobile at reception; and
CL is a variable taking account of the propagation losses and antenna gain between the base station and the mobile unit.

For each mobile unit i, the sub-list associated with it is formed on the basis of a list of transport formats supported by the mobile unit in retaining only the transport formats for which the occupied or busy frequency band is equal to $B_i$.

The result of this is that for a given target spectral density in reception, the total bandwidth used is very great (the greatest possible) and the number of mobile units transmitting simultaneously is the smallest possible.

In other words, each mobile unit $M_1, M_2, \ldots, M_N$ has a maximum number of sub-carriers available (for example $\Delta_{max}$ is the greatest possible value for the mobile unit $M_1$), for a given target spectral density of power. Thus, if we consider M mobile units present in a cell managed by the base station, N mobile units only could simultaneously transmit data according to this technique, with N being smaller than or equal to M, and N being relatively small.

Furthermore, the number of sub-carriers $N_0$ occupied for the transmission will be high.

It is thus observed that for a given mobile unit, the sub-list thus constituted leads to a use of a large part of the total frequency band of the system and to a small number of mobile units transmitting simultaneously. The prior-art techniques therefore seek to occupy the entire frequency band available for transmissions in the OFDM time-frequency frame.

Other techniques for choosing the size of the frequency band used by the mobile units of the network have also been envisaged by Yoon et al. ("*Exploiting channel statistics to improve the average sum rate in OFDMA systems*", Vehicular Technology Conference, 2005, IEEE 61, 30 May-1 Jun. 2005, volume 2, pages 1053-1057) and Sternad et al. ("*Channel estimation and prediction for adaptive OFDMA/TDMA uplinks, based on overlapping pilots*", Acoustics, Speech, and Signal Processing, 2005, Proceedings, IEEE International Conference on, Volume 3, 18-23 Mar. 2005, pages iii/861-iii/864).

In these two techniques, the bandwidth that can be used by a mobile unit of the network is fixed and respectively equal to B/N (where N is an arbitrarily fixed number common to all the mobile units, and is often a small number) and B. The result of this is that the total frequency bandwidth used is B and the total number of mobile units transmitting simultaneously is respectively equal to N, or 1.

According to these different techniques of the prior art, the selection of the transport format associated with a mobile unit of the network then consists in selecting the transport format that can be used to transmit the maximum number of data to be transmitted for a given target quality, as a function of radio conditions and data to be transmitted, according to the classic principle of link adaptation.

However, these prior-art techniques generate two main drawbacks, namely extensive cell interference and inefficient use of the transmission capacity of the mobile units.

Indeed, the fact of using a large part of the total bandwidth of the transmission system causes maximum inter-cell radio interference, thus limiting the cell capacity of the network considered.

Furthermore, the fact of spreading the transmission power of a mobile unit in the frequency domain over a wide bandwidth has the consequence wherein very few mobile units can transmit data at the same time. The result of this is that the maximum capacity of transmission of all the mobile units is not exploited.

SUMMARY

The problem of an embodiment of the invention therefore comprises proposing an approach by which to increase the cellular capacity of a cellular communications network in the form of a method for managing transmission resources in a cellular communications network comprising a plurality of cells each associated with a base station, the network comprising at least two radio communications terminals, a list of available transport formats, called an authorized list, being associated with each of the terminals.

According to an embodiment of the invention, such a method comprises a step for optimizing the frequency resources used by the terminals present in the network, comprising sub-steps of:
    selecting a specific transport format for each of the terminals from a shortened list of transport formats, a shortened list being determined for each of the terminals, and coming from the authorized list associated with the terminal, and
    allocating a frequency band to each of the terminals, dimensioned as a function of the selected transport format.

Thus, an embodiment of the invention relies on a novel and inventive approach to the allocation of resources for communications especially on uplinks, enabling an increase in the cell capacity of the network in a simple and efficient manner.

More specifically, whereas in the prior art the size of the frequency bandwidth was preliminarily fixed and entirely used, thus giving rise to problems of cell interference, an embodiment of the invention seeks to optimize the frequency band used.

To this end, an embodiment of the invention proposes to optimize the frequency resources used by creating a shortened list of transport formats specific to each of the terminals of the network, each shortened list being optimized in frequency.

Thus, an embodiment of the invention is used to reduce the width of the frequency band in which the inter-cell interference is created while at the same time making maximum use of the bandwidth used for each terminal to transmit a maximum number of payload information or data.

Conjointly, an embodiment of the invention enables the use of the transmission capacity of a maximum number of mobile units, i.e. it enables a maximum number of mobile units of the network to transmit simultaneously at maximum power.

According to one particular embodiment of the invention, a shortened list associated with a terminal is determined by selecting at least one transport format from the authorized list corresponding to the terminal as a function of a criterion optimizing spectral efficiency and the quantity of information that said transport format transports.

The term "spectral efficiency" is understood here to mean the ratio between the number of encoded information bits and the number of occupied time-frequency symbols.

Thus, the proposed technique makes it possible to optimize the number of resource units to be used and hence the size of the associated frequency bandwidth for a given terminal and for a given number of information bits to be transmitted.

In other words, it is sought to build a shortened list that is optimized in frequency, i.e. that enables the use of the smallest number of frequency resources possible.

In particular, the method for managing of an embodiment of the invention implements the following algorithm for each terminal of the network:

initializing an empty shortened list;
scanning the authorized list of available transport formats associated with the terminal, and for each transport format:
 if, in the authorized list, there is a transport format for the transporting of a number of encoded information bits smaller than or equal to the number of encoded information bits transported by said transport format and having a spectral efficiency greater than that of said transport format,
 then passing to the next transport format in said authorized list,
 else, adding said transport format to said shortened list and passing to the next transport format in said authorized list.

Thus, for each terminal of the network, from an authorized list of available transport formats associated with the terminal, a shortened list is created comprising solely transport formats that are optimal in terms of use of the frequency band for a given number of information bits.

According to one particular characteristic of an embodiment of the invention, the shortened list is determined and memorized in an apparatus of the network.

According to another variant, the shortened list is determined dynamically in an apparatus of the network.

It is considered that an apparatus of the network may be a base station, a terminal, an intermediate node of the network, etc.

In particular, the shortened list may be transmitted to an apparatus of the network implementing the sub-step of selection of a transport format associated with said terminal.

Indeed, it must be noted that the different steps may be implemented at distinct positions of the network: for example, a shortened list associated with a terminal may be determined at the level of this terminal while the selection of the specific transport format for this terminal from the shortened list may be implemented at the level of the base station managing this terminal. It is therefore necessary to transmit this shortened list to the base station so that it can implement the selection sub-step.

In particular, the shortened list can be transmitted (for example from the terminal to the base station) in the form of signaling.

An embodiment of the invention is for example implemented in an OFDMA type network especially for the management of frequency resources for uplink connections.

According to another aspect of the invention, at least one of the cells of the network comprises at least two terminals, and the optimizing step optimizes the frequency resources used by the terminals present in this cell.

Thus, an embodiment of the invention makes it possible both to optimize the frequency band used for the terminals and to exploit their transmission capacity to the utmost, whether all the terminals are present in a same cell of the cellular network or in distinct cells of the same network.

In other words, if several terminals are present in a same cell, the management method is implemented at the level of the cell, enabling an optimizing of the frequency resources within the cell itself.

Moreover, if several terminals are localized in different cells of the network, the method for managing transmission resources is implemented in each of these cells, leading to an optimization of the frequency resources within each cell and therefore to total optimization of the frequency resources of the network.

Thus, it is not necessary according to an embodiment of the invention to have available a higher entity to manage the different cells of the network, the resource managing technique according to an embodiment of the invention being implemented distributively in each of the cells.

An embodiment of the invention, in another aspect, also concerns an apparatus of the network (for example a terminal, a base station, an intermediate node etc) implementing at least a part of the method for managing according to an embodiment of the invention.

For example, an embodiment of the invention concerns a radio communications terminal designed to be implemented in a cellular communications network comprising a plurality of cells each associated with a base station, a list of available transport formats, called an authorized list, being associated with the terminal.

According to an embodiment of the invention, such a terminal comprises means for optimizing the frequency resources that it uses, the means comprising:

means for selecting a specific transport format for said terminal from a shortened list of transport formats, the shortened list coming from the authorized list associated with the terminal, and
means for allocating a frequency band to said terminal, dimensioned as a function of the selected transport format.

Such a terminal is especially adapted to implementing at least a part of the method of managing as described here above.

This is for example a radiotelephone, PDA (Personal Digital Assistant) or laptop type of terminal.

In another example, an embodiment of the invention concerns a base station designed to be implemented in a cellular communications network comprising a plurality of cells, the network comprising at least two radio communications terminals, a list of available transport formats, called an authorized list, being associated with each of the terminals.

According to an embodiment of the invention, such a base station comprises means for optimizing the frequency resources used by the terminals present in said network, the means comprising:

means for selecting a specific transport format for each of the terminals from a shortened list of transport formats, a shortened list being determined for each of said terminals, and coming from the authorized list associated with said terminal, and
means for allocating a frequency band to at least one of said terminals, dimensioned as a function of the selected transport format.

Such a base station is also adapted to implementing at least a part of the method of managing as described here above.

In particular, it must be noted that these means can be distributed in different apparatuses of the network. For example, a terminal may include means for determining a shortened list that is associated with it and means for transmitting this shortened list to another apparatus of the network, for example a base station. The base station may for its part comprise means for selecting a transport format from the shortened list associated with the terminal, and means for assigning a frequency band to said terminal.

Naturally, it can also be envisaged that it be the base station (or another apparatus of the network) that determines the shortened list associated with the terminal, that transmits the shortened list to the terminal, then that the terminal selects a transport format from this shortened list and indicates this selection to the base station and that, finally, that the base station allocates a frequency band dimensioned as a function of the selected transport format to this terminal.

Finally, another aspect of the invention concerns a computer program product downloadable from a communications network and/or recorded on a computer-readable carrier and/or executable by a processor, comprising program code instructions for the implementation of at least certain steps of the method for managing described here above.

BRIEF DESCRIPTION OF THE DRAWINGS

Other features and advantages shall appear from the following description, given by way of a non-restrictive indicative example, and from the appended drawings, of which.

DETAILED DESCRIPTION OF ILLUSTRATIVE EMBODIMENTS

1. General Principle

The general principle of an embodiment of the invention relies on the determining, for each terminal of a same cellular network, of a shortened list of transport formats supported by the terminal and on the selection of a transport format from this shortened list that the terminal can use for communications with the base station that manages it. The use of this shortened list of an embodiment of the invention leads to an optimizing of the frequency resources used by the set of terminals of the network.

More specifically, the selection of a transport format from a determined shortened list for the different terminals of the network diminishes the frequency band at which the inter-cell interferences are created, while at the same time providing for the best possible exploitation of the bandwidth used to transmit a maximum amount of data. Furthermore, the technique proposed enables a maximum number of terminals of the network to transmit data elements simultaneously, each at its maximum power.

2. Example of an Embodiment

Figure 1:
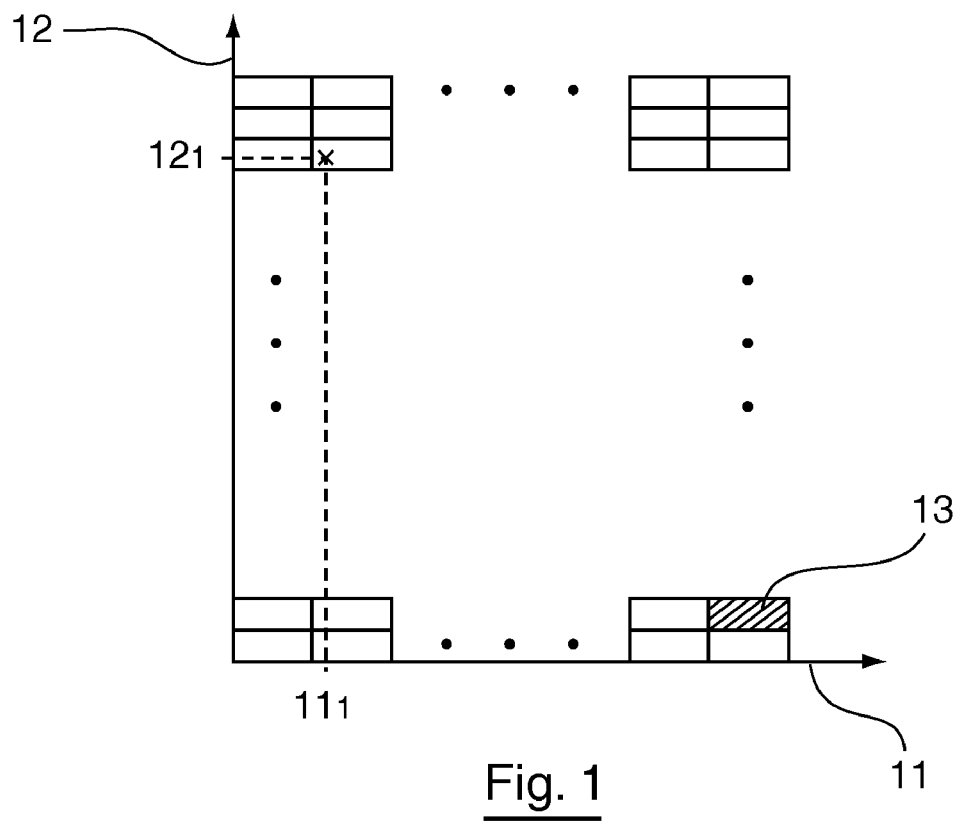
FIG. 1, discussed with reference to the prior art, illustrates a representation of resource units in an OFDM time-frequency frame.
Figure 2:
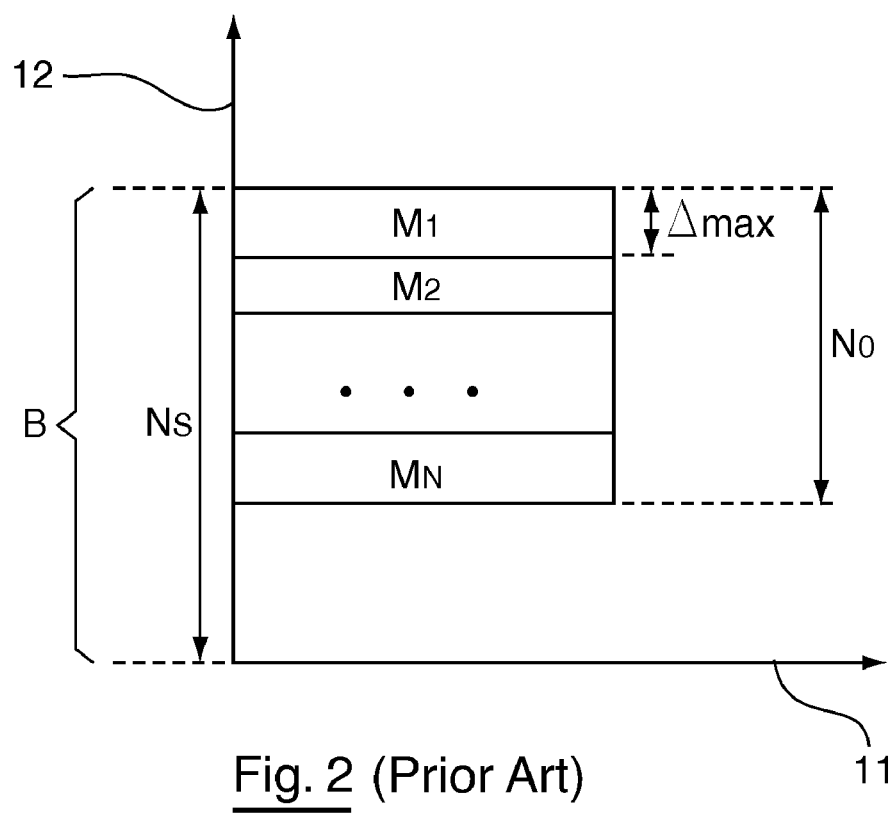
FIG. 2, also discussed with reference to the prior art, represents the distribution of the resources between different terminals in an OFDM time-frequency frame according to the prior art.
Figure 3:
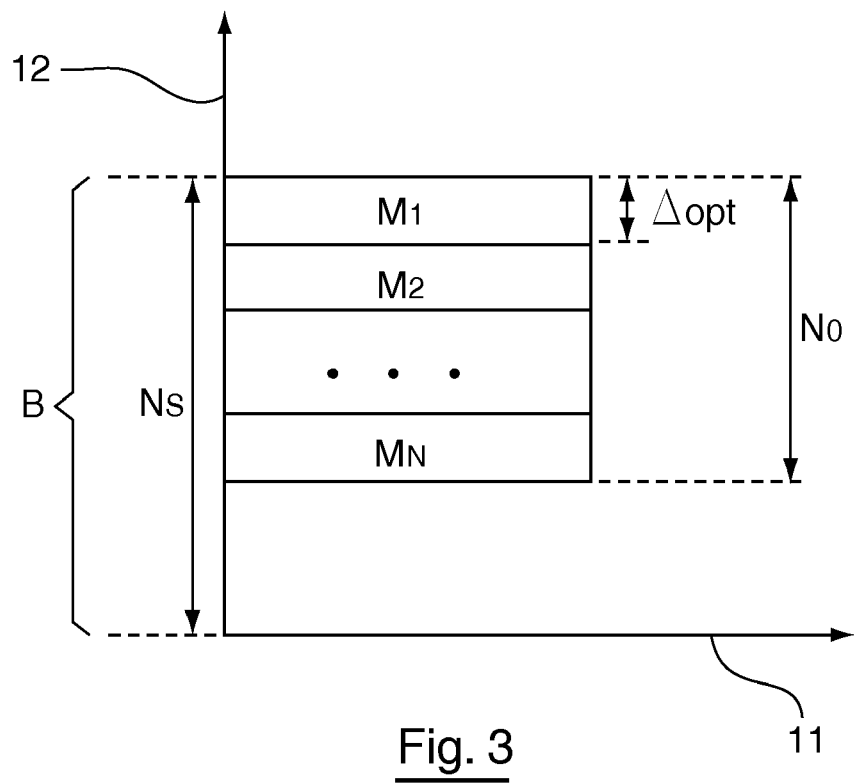
FIG. 3 represents the distribution of resources between different terminals in an OFDM time-frequency frame, according to one embodiment of the invention.
Figure 4:
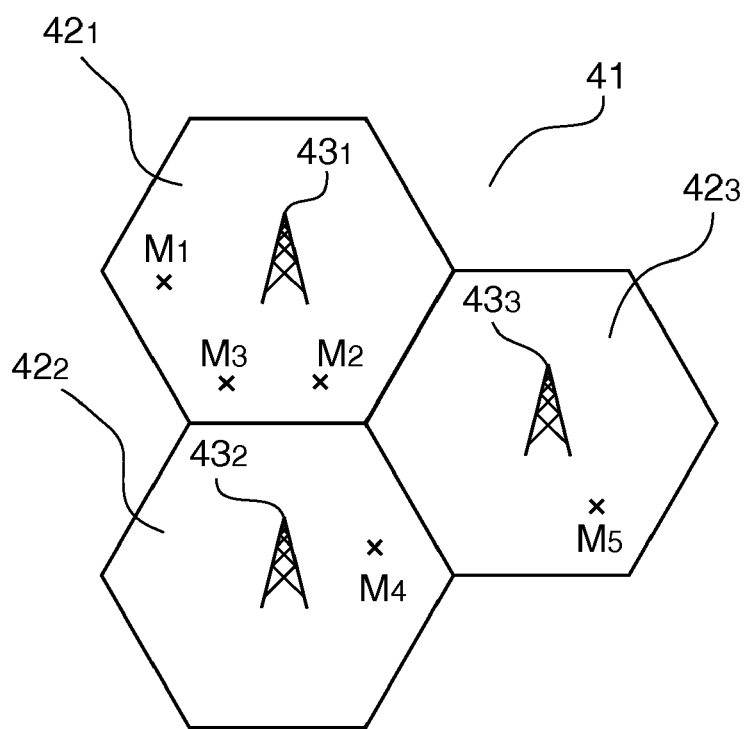
FIG. 4 illustrates a cellular network having several terminals, implementing the method for managing according to FIG. 3.

Referring now to FIGS. 3 and 4, we present an example of an embodiment of the invention.

To this end, we consider a cellular communications network 41 comprising three cells $42_1$, $42_2$ and $42_3$ each associated with a base station, respectively $43_1$, $43_2$ and $43_3$. In this embodiment, the terminals $M_1$, $M_2$ and $M_3$, managed by the first base station $43_1$ are located in the first cell $42_1$. The terminal $M_4$ managed by the second base station $43_2$ is located in the second cell $42_2$. Finally, the terminal $M_5$ managed by the third base station $43_1$ is located in the third cell $42_3$.

Naturally, an embodiment of the invention can also be applied to networks comprising a greater number of cells and/or terminals.

It is assumed moreover that an authorized list of available transport formats, namely transport formats supported by a terminal is associated with each of the terminals $M_1$ to $M_5$.

According to this particular embodiment of the invention, it is sought to optimize the frequency resources used by the terminals present in the network to manage the transmission resources of the network.

To this end, in this particular embodiment of the invention, a distinct shortened list optimized in frequency is determined for each of the terminals $M_1$ to $M_5$.

More specifically, for a given terminal, for example the terminal $M_2$, a shortened list of transport formats, optimal in terms of use of the frequency bandwidth for a given number of information bits, is determined from the authorized list associated with the terminal $M_2$.

This shortened list can be predetermined for at least some of the terminals and stored in an apparatus of the network 41, for example at the first base station $43_1$ or the terminal $M_2$, for the shortened list associated with the terminal $M_2$ or again at an intermediate node of the network.

This shortened list may also be determined dynamically for at least certain of the terminals of the network 41, for example at the first base station $43_1$ or the terminal $M_2$ for the shortened list associated with the terminal $M_2$ or again at an intermediate node of the network.

This shortened list is then communicated to the apparatus of the network 41 implementing the selection of a specific transport format for the terminal, from the shortened list. This shortened list may especially be transmitted in the form of signaling.

For example, if we consider that the terminal $M_2$ comprises a memory storing the shortened list associated with it but if it is the base station $43_1$ that implements the step for selecting the transport format for this terminal, then the terminal $M_2$ must transmit this shortened list to the base station $43_1$.

In particular, if the determining of the shortened list and the selection of a transport format from this shortened list is implemented in the same apparatus, it is not necessary to transmit the shortened list to another apparatus of the network.

Finally, a transport format is selected for each of the terminals as a function of the radio conditions and the number of bits to be transmitted. Thus, each of the terminals is assigned a frequency band dimensioned as a function of the selected transport format.

For example, the selection of an optimized transport format from a shortened list comprises the following steps:
  determining the signal-to-interference ratios (SIRs) for each transport format of the shortened list;
  determining SIR values attainable for each transport format of the shortened list. The term "attainable SIR" denotes the SIR that would be attained if the maximum transmission power available for a terminal was allocated to the resource units of the transport format considered. This notion is defined especially in the document *"Feasibility Study for Enhanced Uplink for UTRA FDD; (R6)"*, 3GPP TR25896-600, March 2004, presenting a technique based on power control for control channels and a measurement of the power available in a sending operation;
  in letting $N_t$ denote the number of bits to be transmitted by the terminal, selecting from the shortened list the transport format enabling the transmission of $N_t$ bits or a maximum number of bits among the $N_t$ bits and having an attainable SIR greater than the target SIR;
  determining the transmission power needed to attain the target SIR of the selected transport format.

Thus, for each terminal, an optimized transport format and a necessary value of transmission power are determined.

In particular, this step for selecting the best adapted transport format and the transmission power of the terminal is considered to be done in an apparatus of the network and more specifically in the terminal and/or the base station. If the selection is done in the terminal, this terminal will have to transmit the result of this step to the base station that manages it (i.e. the selected transport format) so that the base station can choose the positions of the resource units of each terminal of the network within the OFDM frame.

Thus, it is assumed the shortened list of transport formats determined here above is available in an apparatus of the network and that for each transport format, the target SIR has been defined or can be computed by this apparatus, and the attainable SIR can be determined by this apparatus.

The apparatus then, from the shortened list, selects the transport format enabling the transmission of payload information (data to be transmitted) or a maximum of this data for which the attainable SIR is greater than the target value of the SIR. If there is no such transport format, the apparatus decides not to transmit data or to transmit it with the transport format for which the SIR is the highest. Finally, the apparatus chooses the minimum transmission power needed to attain the target SIR of the selected transport format.

Thus, FIG. 3 shows the distribution of resources among different terminals $M_1$ to $M_N$ in an OFDM time-frequency frame.

If we consider a network managing a plurality of mobile units (M mobiles) and if B denotes the total bandwidth of the OFDM system, and Ns the number of associated sub-carriers, it is noted in this particular embodiment of the invention that the frequency bandwidth B, usable by a mobile i is optimized. Each mobile $M_1$, $M_2$ ... $M_N$ therefore uses an optimized number of sub-carriers ($\Delta_{opt}$ for the mobile $M_1$).

The result of this is that, for a given mobile unit and for a given number of information bits to be transmitted, the proposed technique optimizes the number of resource units to be used in the time-frequency frame and therefore optimizes the size of the associated bandwidth (by reducing it relative to the prior art techniques).

Thus, if we consider M mobile units present in a network, N mobile units could simultaneously transmit data according to this technique with N being smaller than or equal to M and N being high (fairly close to M).

Furthermore, the number of sub-carriers $N_O$ occupied for the transmission is low in comparison with the prior art techniques.

3. Determining a Shortened List

Figure 5:
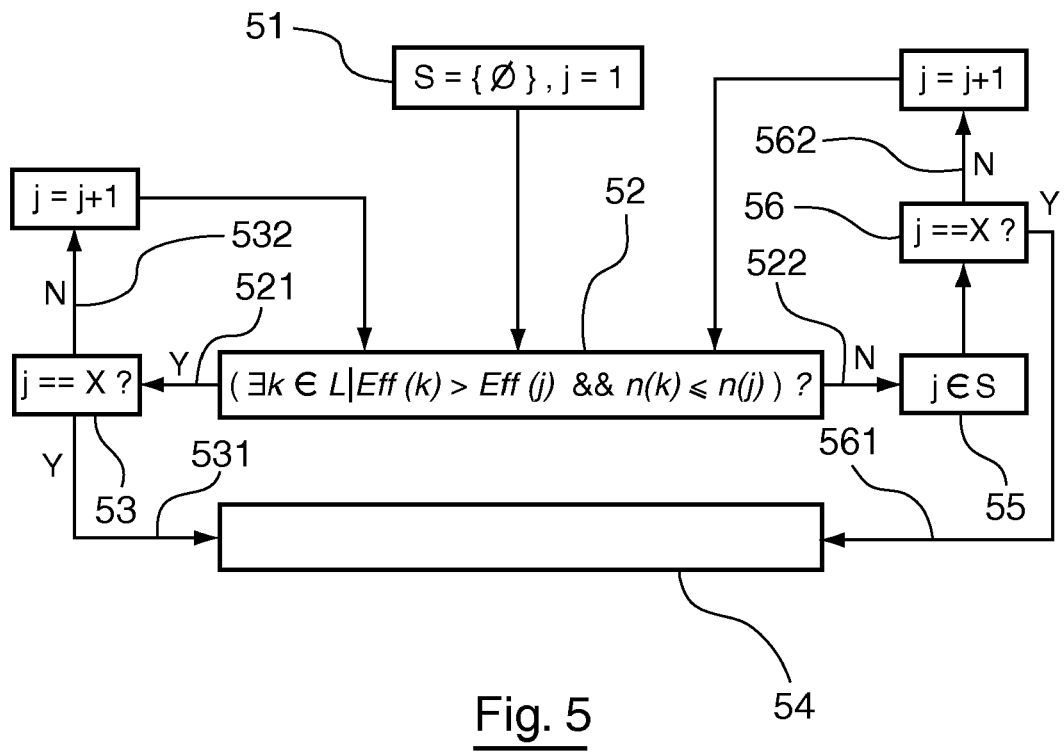
FIG. 5 presents an algorithm for determining a shortened list according to an embodiment of the invention.

Referring now to FIG. 5, a description is given of an example of an algorithm for determining a shortened list, for a given terminal.

More specifically, it is recalled that the shortened list is derived from a list of available transport formats associated with the terminal considered, called an authorized list. This shortened list is determined by making a selection from the authorized list of at least one transport format as a function of a criterion that optimizes spectral efficiency and the quantity of information that it carries.

According to the algorithm proposed, a transport format is included in the shortened list if and only if, in the authorized list of transport formats supported by the considered terminal, there are no other transport formats used to transmit a identical or smaller quantity of information with a type of modulation and encoding (MCS) having greater spectral efficiency. It may be recalled that the spectral efficiency is defined here as the ratio between the number of encoded information bits transported by the transport format and the number of occupied time-frequency symbols.

In particular, for a terminal $M_1$ we consider:
  X the number of transport formats supported by the terminal $M_1$, forming the authorized list associated with the terminal $M_1$;
  for each transport format j from 1 to X:
    eff(j) the spectral efficiency of the transport format j;
    n(j) the number of encoded information bits transported by the transport format j;
  L being the authorized list of transport formats: L= $\{1, \ldots, X\}$; and
  S the shortened list of optimum transport formats associated with the terminal $M_1$.

Referring to FIG. 5, during a first step 51, an empty shortened list S is initialized such as that:

$$S=\{k \epsilon L | T(k)=0\}$$

$$F(k)=\{j \epsilon L | n(j) \leq n(k) \text{ and } \textit{eff}(j) > \textit{eff}(k)\}$$

$$T(k) = \text{number\_of\_elements\_of\_}F(k)$$

Then, the authorized list L associated with the terminal $M_1$ considered is scanned for each transport format j from 1 to X.

During the initialization step 51, we therefore have j=1.

During a testing step 52, a check is made to see if there is a transport format k in the authorized list L such that eff(k)>eff(j) and n(k)≦n(j):
  if this is effectively the case (521), then a check is made to see if the transport format j considered is the last of the authorized list in a test 53:
    if the answer is positive (531) the shortened list S is considered to be entirely determined during a step 54;
    if the answer is negative (532) the operation passes to the next transport format in the authorized list (j=j+1) and then the operation loops back to the testing step 52.
  The transport format j considered is therefore not added to the shortened list S.
  if this is not the case (522), i.e. if n(j)<n(k) or if eff(j)≧eff(k) then the transport format j is inserted into the shortened list S during a step 55. A check is then made during a test 56 to see if the transport format j considered is the last of the authorized list:

if the answer is affirmative (561) the shortened list S is considered to be entirely determined during a step 54;

if the answer is negative (562) the operation passes to the next transport format in the authorized list (j=j+1) and then the operation loops back to the testing step 52.

Thus, the step 54 corresponds to a final state in which the shortened list S associated with the terminal $M_1$ is determined.

Figure 6:
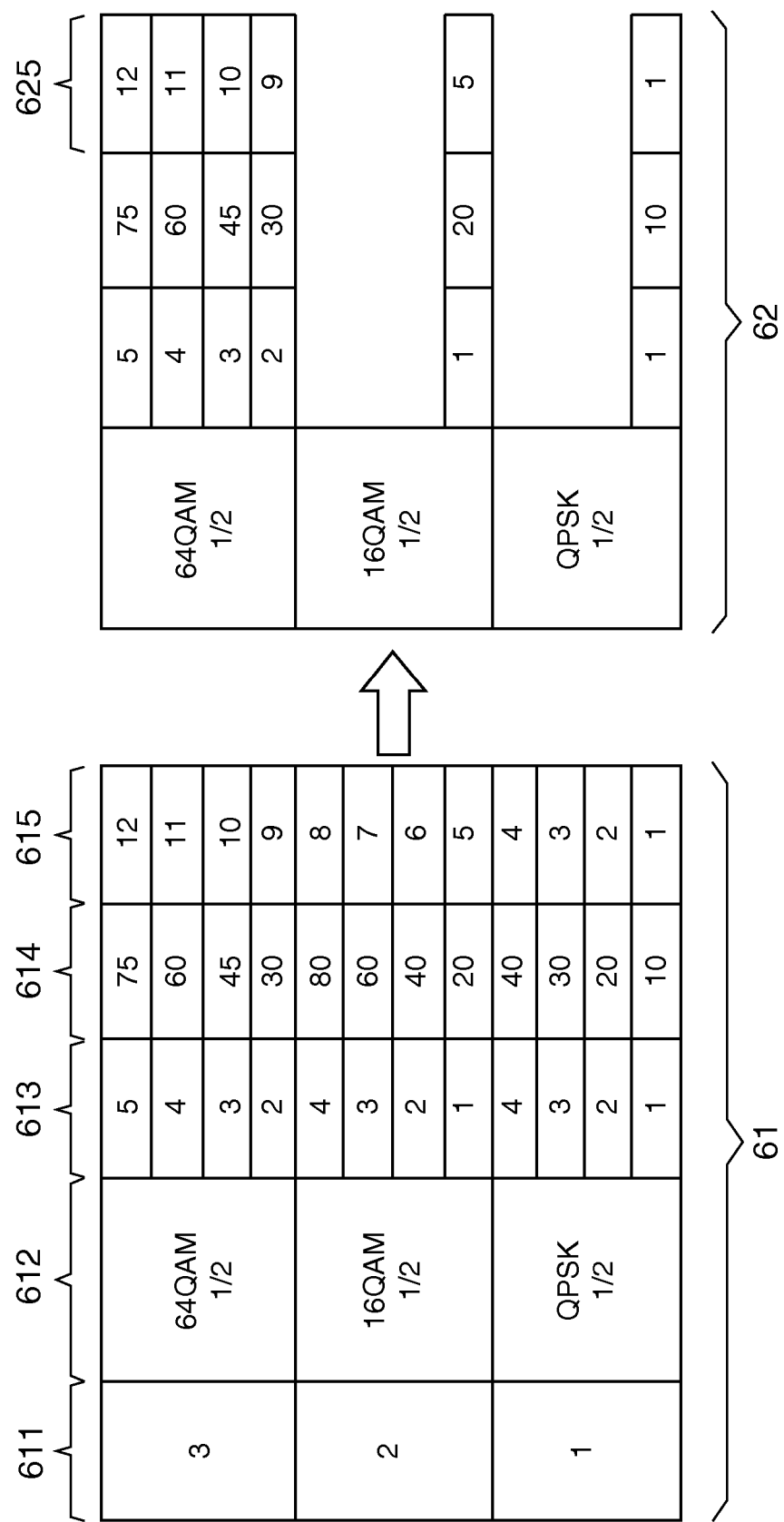
FIG. 6 illustrates an example of shortened lists obtained by using the algorithm of FIG. 5.

FIG. 6 illustrates an example of an authorized list of transport formats 61 associated with a mobile unit $M_1$ comprising twelve transport formats 615 identified by the identifiers 1 to 12, and of a shortened list associated with this same terminal, comprising no more than six transport formats 625 identified by the identifiers 1, 5, 9, 10, 11 and 12 following the implementation of the algorithm described with reference to FIG. 5 for example.

More specifically, FIG. 6 indicates the identifier 615 associated with a transport format as a function of:

its spectral efficiency 611 (for example having a value 1, 2 or 3);

the modulation and encoding scheme MCS 612 (for example a quadrature amplitude modulation QAM64 of rate ½, quadrature amplitude modulation QAM16 of rate ½ or again QPSK phase modulation of rate ½);

the number of resource units used 613;

the number of information bits.

According to the algorithm presented here above, the authorized list 61 of transport formats is gone through to determine whether, for each transport format identified from 1 to 12, there is a transport format in the authorized list transporting a number of encoded information bits smaller than or equal to the number of encoded information bits transported by the current transport format and having a spectral efficiency greater than that of the current transport format. If this is the case, the current transport format does not belong to the shortened list and the operation passes to the next format in the authorized list.

By applying this algorithm, only the transport formats identified by the identifiers 1, 5, 9, 10, 11 and 12 belong to the shortened list thus determined.

As indicated here above, the proposed technique can thus be used to choose a transport format for a terminal from among a shortened list thus enabling the quantity of frequency resources used to be minimized for any given mobile unit and number of bits.

4. Example of an Application of an Embodiment of the Invention in an OFDM System Here below, a description is provided of an example of application of an embodiment of the invention in a complete OFDM system.

This example uses a classic algorithm for the scheduling of the mobile units and choice of resource units. More specifically, the allocation of transmission resources in a communications network comprises the following steps:

selecting an optimized transport format for each terminal chosen from a shortened list associated with the terminal as described here above with reference to the description of a particular embodiment of the invention;

scheduling of the terminals creating a list of ordered mobile units complying with rules of priority;

choosing positions of resource units complementing the OFDM frame as and when they are chosen in considering each mobile unit of the network one by one and in proceeding by descending order of priority. More specifically, for a given mobile, the positions of the resource units (URs) are chosen in complying with the number of URs needed for the selected transport format.

It can be noted especially that the first two steps can be implemented simultaneously or successively but that the third step can only be done once the first two steps have been performed.

More specifically, the example presented here below pertains to a WIMAX network for which a time-frequency division into disjoined resource units has been predefined.

For instance, at a given point in time, a base station determines the resources that could be allocated to a future frame.

In a preliminary step (denoted step 0) the frame is pre-filled with communications between a terminal and a base station not subjected to the optimization of the band. For example, assuming that synchronous HARQ (Hybrid Automatic Repeat Request) mechanisms are used, resources are allocated to the retransmissions: the same number of URs and the same power is allocated as in the case of the first transmission.

In a following step denoted step 1, the new transmissions are scheduled.

More specifically:

the base station makes an ordered list of the users of the terminals needing new transmission;

the terminals are ordered in a rising order of priority. In particular the priority may be determined following highly varied metrics such as those proposed in the Qualcomm document referred to here above (for example "Proportional Fair Scheduler", "Round Robin", or again "Max Channel Quality", etc).

It will be noted in this respect that the choice of the scheduling is independent of the technique for managing transmission resources proposed according to an embodiment of the invention.

During a following step denoted step 2, a specific format is selected for each terminal from the shortened list associated with each terminal.

More specifically, for each user of the ordered list referred to here above, the base station selects the transport format associated with the terminal of the user according to the technique described, and determines the transmission power of the terminal associated with this transport format.

At the end of this step, we therefore know the number of URs needed for each terminal belonging to the ordered list.

Finally, in a third step denoted step 3, it is possible to choose the positions of the URs and fill the corresponding frame.

Thus, for each terminal of the ordered list associated with a specific transport format:

the base station considers each of the terminals in turn in the descending order of priority until all the terminals have been processed, or until the filling criterion is met. In particular, any filling criterion can be used such a criterion belonging, for example to the group where:

the frame is entirely filled;

the occupancy rate of the frame is above a predetermined threshold;

a maximum total power predicted at reception is attained.

for each terminal, the base station which manages it allocates the number of URs determined at the step 2 and chooses the position of these resource units in the frame. In particular, different known algorithms can be implemented. For example, the position of the URs in the frame may be chosen such that:

the occupied frequencies are close to each other or distant from each other;

the frequencies occupied in two distinct cells are close to each other or distant from each other, depending on whether the filling of the predetermined time-frequency frame follows an identical scheme in all the cells or a distinct scheme;

the occupied frequencies have pseudo-random values;

the occupied frequencies occupied by each terminal show the best quality of the link.

etc.

Figure 7:
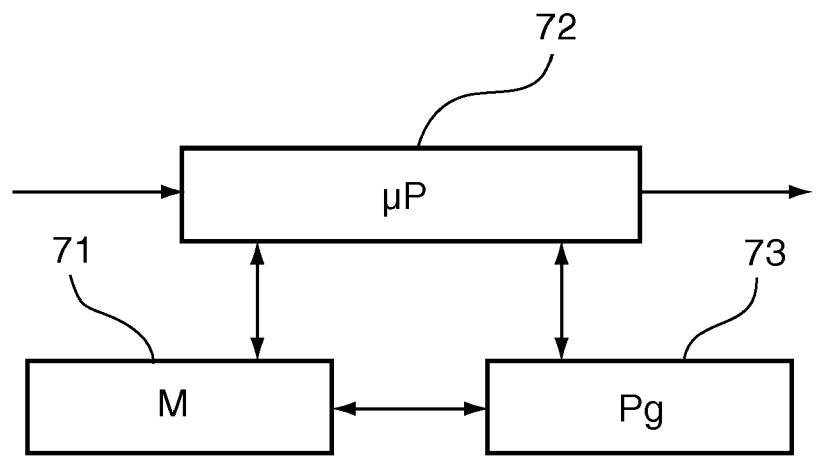
FIG. 7 presents the structure of a device implementing a technique of management of the transmission resources according to a particular embodiment according to the invention.

5. Structure of an Apparatus of the Network for Managing Transmission Resources Finally, FIG. 7 presents the simplified structure of an apparatus of the network for managing transmission resources according to the particular embodiment described here above.

An apparatus of this kind has a memory 71, a processing unit 72 equipped for example with a microprocessor μP and driven by the computer program 73 implementing the method according to an embodiment of the invention for managing transmission resources.

At initialization, the code instructions of the computer program 73 are for example loaded into a RAM before being executed by the processor of the processing unit 72. The processing unit 72 receives at input at least one list of the terminals present in the network. The microprocessor of the processing unit 72 implements the steps of the method for managing resources described here above, according to the instructions of the computer program 73 to determine a shortened list of transport formats associated with each of the terminals and select a specific transport format among these shortened lists. To this end, the apparatus comprises means for selecting a specific transport format for each of the terminals from a shortened list of transport formats, a shortened list being determined for each of the terminals, and coming from an authorized list associated with the terminal, and means for allocating a frequency band to the terminals, dimensioned as a function of the selected transport format. These means are driven by the microprocessor of the processing unit 72.

The processing unit 72 therefore outputs an OFDM frame in which the allocation of the frequency resources is optimized.

Although the present disclosure has been described with reference to one or more examples, workers skilled in the art will recognize that changes may be made in form and detail without departing from the scope of the disclosure and/or the appended claims.

The invention claimed is:

1. A method for managing transmission resources in a cellular communications network comprising a plurality of cells, each associated with a base station, the network comprising at least two radio communications terminals, an authorized list of available transport formats being associated with each of the terminals, wherein the method comprises:
    creating a shortened list for each of said terminals by implementing the following algorithm:
        initializing an empty shortened list; and
        scanning the authorized list of available transport formats associated with said terminal and for each transport format:
            if, in said authorized list, there is a transport format for transporting a number of encoded information bits smaller than or equal to the number of encoded information bits transported by said transport format and having a spectral efficiency greater than that of said transport format,
            then passing to the next transport format in said authorized list,
            else, adding said transport format to said shortened list and passing to the next transport format in said authorized list; and
    optimizing frequency resources used by said terminals present in said network, comprising sub-steps of:
        selecting a specific transport format for each of said terminals from the shortened list of transport formats, and
        allocating a frequency band to each of said terminals, dimensioned as a function of the selected transport format.

2. The method for managing according to claim 1, wherein said shortened list is determined and memorized in an apparatus of said network.

3. The method for managing according to claim 1, wherein said shortened list is dynamically determined in an apparatus of said network.

4. The method for managing according to claim 1, wherein said shortened list is transmitted to an apparatus of the network implementing the sub-step of selecting a specific transport format associated with said terminal.

5. The method for managing according to claim 1, wherein said network is an OFDMA type network.

6. The method for managing according to claim 1, and further comprising using the method to manage the frequency resources for uplinks.

7. The method for managing according to claim 1, wherein at least one of the cells of said network comprises at least two terminals and said step of optimizing optimizes the frequency resources used by said terminals present in said cell.

8. A radio communications terminal designed to be implemented in a cellular communications network comprising a plurality of cells, each associated with a base station, an authorized list of available transport formats being associated with said terminal, wherein said terminal comprises:
    means for determining a shortened list for each of said terminals by implementing the following algorithm:
        initializing an empty shortened list; and
        scanning the authorized list of available transport formats associated with said terminal and for each transport format:
            if, in said authorized list, there is a transport format for transporting a number of encoded information bits smaller than or equal to the number of encoded information bits transported by said transport format and having a spectral efficiency greater than that of said transport format,
            then passing to the next transport format in said authorized list,
            else, adding said transport format to said shortened list and passing to the next transport format in said authorized list; and
    means for optimizing frequency resources used by said terminal present in said network, said means comprising:
        means for selecting a specific transport format for the terminal from the shortened list of transport formats, and
        means for allocating a frequency band to said terminal, dimensioned as a function of the selected transport format.

9. A base station designed to be implemented in a cellular communications network comprising a plurality of cells, the network comprising at least two radio communications terminals, an authorized list of available transport formats being associated with each of said terminals, wherein said base station comprises:
- means for determining a shortened list for each of said terminals by implementing the following algorithm:
  - initializing an empty shortened list; and
  - scanning the authorized list of available transport formats associated with said terminal and for each transport format:
    - if, in said authorized list, there is a transport format for transporting a number of encoded information bits smaller than or equal to the number of encoded information bits transported by said transport format and having a spectral efficiency greater than that of said transport format,
    - then passing to the next transport format in said authorized list,
    - else, adding said transport format to said shortened list and passing to the next transport format in said authorized list; and
- means for optimizing frequency resources used by said terminals present in said network, the means comprising:
  - means for selecting a specific transport format for each of the terminals from the shortened list of transport formats, and
  - means for allocating a frequency band to at least one of said terminals, dimensioned as a function of the selected transport format.

10. A computer program product recorded on a non-transitory computer-readable medium and executable by a processor, the program comprising program code instructions for implementation of a method for managing transmission resources in a cellular communications network comprising a plurality of cells each associated with a base station, the network comprising at least two radio communications terminals, an authorized list of available transport formats being associated with each of the terminals, wherein the method comprises:
- creating a shortened list for each of said terminals by implementing the following algorithm:
  - initializing an empty shortened list; and
  - scanning the authorized list of available transport formats associated with said terminal and for each transport format:
    - if, in said authorized list, there is a transport format for transporting a number of encoded information bits smaller than or equal to the number of encoded information bits transported by said transport format and having a spectral efficiency greater than that of said transport format,
    - then passing to the next transport format in said authorized list,
    - else, adding said transport format to said shortened list and passing to the next transport format in said authorized list; and
- optimizing frequency resources used by said terminals present in said network, comprising sub-steps of:
  - selecting a specific transport format for each of said terminals from the shortened list of transport formats, and
  - allocating a frequency band to each of said terminals, dimensioned as a function of the selected transport format.

\* \* \* \* \*